US007417093B1

(12) United States Patent
Colle et al.

(10) Patent No.: US 7,417,093 B1
(45) Date of Patent: Aug. 26, 2008

(54) FUNCTIONALIZATION OF OLEFIN/DIENE COPOLYMERS

(75) Inventors: Karla S. Colle, Houston, TX (US); Caiguo Gong, Pearland, TX (US); Kevin R. Squire, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 11/804,775

(22) Filed: May 21, 2007

(51) Int. Cl.
*C08C 19/04* (2006.01)
*C08F 8/06* (2006.01)

(52) U.S. Cl. ............... 525/387; 525/383; 525/332.1; 525/331.9

(58) Field of Classification Search ........... 525/383, 525/387, 332.1, 331.9
See application file for complete search history.

(56) References Cited

U.S. PATENT DOCUMENTS 4,833,210 A * 5/1989 Fujii et al. ............... 525/332.1
5,155,247 A 10/1992 Herrmann et al.

FOREIGN PATENT DOCUMENTS

| EP | 0 474 083 | 3/1992 |
| EP | 1 217 011 | 6/2002 |
| GB | 1130485 | 10/1968 |
| GB | 2055821 | 3/1981 |
| JP | 05 214014 | 8/1993 |
| JP | 2001-031716 A | 2/2001 |
| JP | 2004 292605 | 10/2004 |
| SU | 1 700 008 | 12/1991 |
| WO | WO 98/28338 | 7/1998 |
| WO | WO 02/10228 | 2/2002 |

OTHER PUBLICATIONS

Y. Sarazin et al., "Copolymerization of Propene and 5-Vinyl-2-Norbornene: A Simple Route to Polar Poly(propylene)s"; Macromolecular Rapid Communications, vol. 26, pp. 1208-1213, 2005.
F. Song et al., "Derivatization of Propene/Methyloctadiene Copolymers: A Flexible Approach to Side-Chain-Functionalized Polypropenes," Journal of Polymer Science: A Polymer Chemistry, vol. 40, pp. 1484-1497, 2002.
E.F.M. Barradas et al., "Epoxidation of Cyclohexene on Heterogenized Molybdenum Compounds," Brazilian Journal of Chemical Engineering, vol. 15, No. 2, 1998.
G. Soldaini, "Methyltrioxorhenium (MTO)," Synlett, No. 10, pp. 1849-1850, 2004.
M. C. A. van Vliet et al., "Methyltrioxohenium-catalysed eposidation of alkenes in trifluoroethanol," Chem. Comm., pp. 821-822, 1999.
Prof. Dr. W.A. Hermann et al., "Methyltrioxorhenium as Catalyst for Olefin Oxidation," Angew. Chem. Int. Ed. Engl.; vol. 30, pp. 1638-1641, 1991.
S. Marathe et al., "Regioselective Copolymerization of 5-Vinyl-2-norbornene with Ethylene Using Zirconocene-Methylaluminoxane Catalysts: A Facile Route to Functional Polyolefins," American Chemical Society, vol. 27, pp. 1083-1084, 1994.
X. Li et al., "Scandium-Catalyzed Copolymerization of Ethylene with Dicyclopentadiene and Terpolymerization of Ethylene, Dicyclopentadiene, and Styrene," Macromolecules, vol. 38, pp. 6767-6769, 2005.
J. Suzuki et al., "Synthesis and Functionalization of Poly(ethylene-co-dicyclopentadiene)," Journal of Applied Polymer Science, vol. 72, pp. 103-108, 1999.

* cited by examiner

*Primary Examiner*—Ling-Siu Choi

(57) ABSTRACT

In a process for functionalizing an α-olefin/diene copolymer, a copolymer comprising units derived from at least one α-olefin and units derived from at least one diene, which copolymer contains at least one double bond, is contacted in a reaction medium with an alkyl hydroperoxide in the presence of a catalyst comprising a metal of Group 5 or 6 of the Periodic Table or a compound thereof, under reaction conditions which promote formation of an oxirane ring or hydroxyl groups at the site of the double bond.

14 Claims, No Drawings

FUNCTIONALIZATION OF OLEFIN/DIENE COPOLYMERS

FIELD OF THE INVENTION

This invention relates to process for functionalizing copolymers of α-olefins and dienes.

BACKGROUND OF THE INVENTION

Functionalized polyolefin (FPO) materials have potential usefulness for a number of commercial applications. Polyolefins that are reactive or polar can, for example, provide products for major applications, such as high temperature elastomers resistant to oil, and can also provide structural polyolefins. Polyolefins in the form of oil resistant elastomers could compete with chloroprene and nitrile rubber in oil resistant applications but could offer better high temperature performance and service life than ethylene-propylene diene rubbers at a comparable price. Structural polyolefins could be low cost polymeric materials with improved stiffness, strength and use temperatures that would extend the boundary of polyolefins to structural applications, for example to uses within the automotive area.

Post-polymerization functionalization requires synthesis of precursor olefin copolymers which carry functionalizable "reactive hooks", such as residual double bonds or aromatic rings. Such "reactive hooks" can then be appropriately functionalized using various chemistries. Functionalizable copolymer precursors which contain reactive hooks in the form of residual double bonds are conveniently produced by incorporating a diene co-monomer into the copolymer precursor. One of the double bonds in the diene comonomer permits co-polymerization of the co-monomer with one or more α-olefins, while the remaining unreacted double bond in each of the pendent co-monomer moieties along the polymer chain is then available for conversion to selected polar groups via a separate process, generally in a different reactor.

This olefin-diene approach allows production of a wide range of products using a single technology. Functionalization of the diene co-monomers within the copolymer precursor permits the introduction of polarity for oil resistance and can also improve the thermal and chemical stability characteristics of the resulting functionalized copolymer materials. Further, the glass transition temperature, $T_g$, of the resulting functionalized copolymer can be adjusted by both the choice and content of the diene co-monomer.

One type of known functionalization of olefin/diene copolymers involves reaction of the copolymer precursor material with an oxidizing agent to provide an epoxidized material having oxirane groups formed at the sites of the residual double bonds within the copolymer precursor. Further hydrolysis of such epoxidized materials can convert the oxirane groups to diol moieties within the resulting functionalized copolymers.

It is known to epoxidize olefin-diene copolymer materials, such as ethylene/dicyclopentadiene, using peracids such as performic acid or m-chloroperbenzoic acid as an oxidizing agent. Such epoxidation reactions can provide quantitative or near-quantitative conversion of the residual diene co-monomer double bonds into oxirane groups, with the further possibility of converting some or all of such oxirane moieties to diols. Representative prior art disclosing epoxidation and/or hydroxylation of olefin-diene copolymer materials includes Marathe et al: 27 *Macromolecules*, 1083 (1994); Sarazin et al; 26 *Macromol. Rapid Commun*, 83 (2005); Song et al; 40 *J. Polym. Sci. Polym. Chem.*, 1484 (2002); Shigenobu et al (Maruzen Petrochemical); Japanese Patent Appln. No. JP2001-031716A; Suziki et al; 72 *J. Polym. Sci. Polym. Chem.*, 103 (1999); and Li et al; 38 *Macromolecules*, 6767 (2005).

The catalytic functionalization of unsaturated materials is also known. Rhenium-containing catalysts have been used, for example, to epoxidize and/or hydroxylate a variety of non-polymeric alkenes. And there are a few examples in the art of catalytic oxidation being used to introduce epoxy groups into copolymers containing relatively low levels of unsaturation or unsaturation which is primarily found within the copolymer backbone. Representative prior art disclosing rhenium-catalyzed epoxidation and/or hydroxylation of alkene materials includes Herrmann et al; *Angew. Chem. Int. Ed. Engl.*; 1991, 30, (1638); Herrmann et al (Hoechst AG); U.S. Pat. No. 5,155,247; Issued Oct. 13, 1992; Van Vliet et al; *Chem. Commun.*; 1999, pp 821-822; and Soldaini; *SYNLETT* 2004, No. 10, pp 1849-1850.

Epoxidation of copolymers having higher levels of unsaturated co-monomers is, however, more difficult than functionalization of non-polymeric alkenes, either without or with a suitable catalyst. Such functionalizable copolymers with higher levels of diene-derived co-monomers therein have enhanced potential for side reactions and cross-linking which can be brought about by the presence of greater amounts of organic peracids used as epoxidizing agents. Use of a catalyst can eliminate the need for the presence of large amounts of acidic reagents and can permit the use of peroxides as oxidizing agents. However, the presence of a catalyst can also promote cross-linking or side reactions of the diene-derived comonomer-containing copolymer and/or can also potentially degrade the oxidizing agent which is being used along with the catalyst.

Given the actual and potential usefulness of functionalized olefin/diene copolymers, and especially those functionalized by epoxidation, for a variety of commercial applications, it would be desirable to identify new and efficient processes for preparing such epoxidized and/or hydroxylated copolymer materials. According to the present invention, it has now been found that α-olefin/diene copolymers can be effectively functionalized by reaction with an alkyl hydroperoxide in the presence of a catalyst comprising a metal of Group 5 or 6 of the Periodic Table or a compound thereof. The reaction is not radical-initiated and so side reactions, such as cross-linking, that are common with free radical reactions are substantially eliminated. Also the reaction with hydroperoxide generates an alcohol as a by-product, which can readily be removed and recycled or otherwise processed.

Barradas et al. in Braz. *J. Chem. Eng.*, Vol. 15, No. 2, June 1998, disclose catalytic epoxidation of cyclohexene by tert-butyl hydroperoxide in the presence of a catalyst produced by heterogenization of molybdenum species, starting either with $Mo(CO)_6$ or $MoO_2(acac)_2$, on the surface of functionalized silica bearing one (Si-Et1) or two (Si-Et2) ethylenediamine ligands.

SUMMARY OF THE INVENTION

Accordingly, the invention resides in one aspect in a process for functionalizing an α-olefin/diene copolymer, which process comprises contacting in a reaction medium (a) a copolymer comprising units derived from at least one α-olefin and units derived from at least one diene, which copolymer contains at least one double bond, with b) an alkyl hydroperoxide in the presence of a catalyst comprising a metal of Group 5 or 6 of the Periodic Table or a compound thereof, under reaction conditions which promote formation of an oxirane ring or hydroxyl groups at the site of said double bond.

Conveniently, said at least one α-olefin is selected from ethylene and propylene. In one embodiment, said at least one α-olefin comprises a combination of ethylene with another α-olefin selected from 1-octene, 1-hexene and/or 1-butene.

Conveniently, said copolymer comprises a terpolymer of at least one α-olefin, at least one diene and at least one further comonomer which is selected from acyclic, monocyclic and polycyclic mono-olefins containing from about 4 to 18 carbon atoms.

Conveniently, said at least one diene is selected from dicyclopentadiene; ethylidene norbornene; 7-methyl-1,6-octadiene; 1,4-hexadiene; and 4-vinyl-cyclohexene.

Conveniently, said copolymer comprises 5 to 50 mole %, such as 10 to 35 mole %, of units derived from said at least one diene.

In one embodiment, said metal comprises molybdenum.

Conveniently, said alkyl hydroperoxide comprises from about 3 to about 8 carbon atoms and in one embodiment comprises t-butyl hydroperoxide.

DETAILED DESCRIPTION OF THE INVENTION

As used herein the term "copolymer" is intended to mean a material which is prepared by copolymerizing at least two different co-monomer types including the essentially present co-monomers derived from α-olefins and dienes. One or more other different co-monomer types may also be included in the copolymer such that the copolymer definition includes terpolymers as well as copolymers comprising four or more different comonomer types.

As used herein, the numbering scheme for the Periodic Table Groups is the new notation as set out in Chemical and Engineering News, 63(5), 27 (1985).

The present process is directed to functionalizing α-olefin/diene copolymers, and in particular copolymers comprising units derived from at least one α-olefin and units derived from at least one diene, which copolymer contains at least one double bond, by contacting the copolymer with an alkyl hydroperoxide in the presence of a catalyst comprising a metal of Group 5 or 6 of the Periodic Table or a compound thereof, under reaction conditions which promote formation of an oxirane ring or hydroxyl groups at the site of said double bond.

Copolymer Precursor

The copolymer precursors that are epoxidized in accordance with the present process are copolymers comprising at least one α-olefin and at least one diene, such that the copolymer contains at least one double bond.

The α-olefin comonomers that can be utilized herein are generally those acyclic unsaturated materials comprising $C_2$ to $C_{12}$ hydrocarbons. Such materials may be linear or branched and have one double bond in the α position. Illustrative non-limiting examples of preferred α-olefins are ethylene, propylene, 1-butene, 1-pentene, 1-hexene, 1-octene and 1-dodecene. Ethylene and propylene are preferred α-olefins with ethylene being most preferred. Combinations of α-olefins may also be used such as a combination of ethylene with 1-octene, 1-hexene and/or 1-butene. The α-olefin(s) will generally be incorporated into the precursor copolymers herein to the extent of from about 5 mole % to about 95 mole %, more preferably from about 55 mole % to about 85 mole %.

The dienes that can be utilized herein may be conjugated or non-conjugated, cyclic or acylic, straight chain or branched, flexible or rigid.

Examples of the suitable conjugated dienes include cyclic conjugated dienes such as 1,3-cyclopentadiene, 1,3-cyclohexadiene, 1,3-cycloheptadiene, 1,3-cyclooctadiene and derivatives thereof, and linear conjugated dienes such as isoprene, 1,3-butadiene, 1,3-pentadiene, 1,3-hexadiene, and 2,3-dimethyl-1,3-butadiene. Such conjugated dienes may be used singly or in a combination of two or more types.

Typical non-limiting examples of non-conjugated dienes useful herein are:

(a) straight chain acyclic dienes, such as 1,4-hexadiene and 1,6-octadiene;

(b) branched chain acyclic dienes, such as 5-methyl-1,4-hexadiene; 3,7-dimethyl-1,6-octadiene; 3,7-dimethyl-1,7-dioctadiene; and the mixed isomers of dihydromyrcene and dihydro-ocimene;

(c) α,ω-dienes which contain from 7 to 12 carbon atoms including 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and the like;

(d) single-ring dienes, such as: 1,4-cyclohexadiene; 1,5-cyclooctadiene; and 1,5-cyclododecadiene; and (e) multi-ring fixed and fused ring dienes, such as: tetrahydroindene; methyltetrahydroindene; dicyclopentadiene (DCPD); bicyclo-(2,2,1)-hepta-2,5-diene; alkenyl, alkylidene, cycloalkenyl and cycloalkylidene norbornenes, such as 5-methylene-2-norbornene (MNB), 5-ethylidene-2-norbornene (ENB), 5-propenyl-2-norbornene, 5-(4-cyclopentenyl)-2-norbornene, 5-cyclohexylidene-2-norbornene, and 5-vinyl-2-norbornene (VNB).

When precursor copolymers which are high temperature elastomeric materials resistant to oil are desired, flexible dienes are used to form the precursor copolymers herein. Suitable flexible dienes include 7-methyl-1,6-octadiene; 1,4-hexadiene; and 4-vinyl-1-cyclohexene.

When precursor copolymers which are rigid, structural polyolefins are desired, rigid dienes are used to form the precursor copolymers herein. Suitable rigid dienes include dicyclopentadiene (DCPD); 5-methylene-2-norbornene (MNB), and 5-ethylidene-2-norbornene (ENB), with dicyclopentadiene (DCPD) being preferred.

The diene-derived comonomer will generally be incorporated into the precursor copolymers herein to the extent of from about 5 mole % to about 50 mole %, more preferably from about 10 mole % to about 35 mole %.

The copolymer precursor component may also optionally comprise additional ancillary comonomers which are neither α-olefins nor dienes. Such optional ancillary comonomers will generally be acyclic, monocyclic or polycyclic mono-olefins containing from 4 to 18 carbon atoms.

Preferred ancillary comonomers are the acyclic monoolefins such as cyclohexene and cyclooctene and the polycylic monolefins such as those described in U.S. Pat. No. 6,627,714, incorporated herein by reference. Specific examples of such polycylic monolefins include 2-norbornene, 1,4,5,8-dimethano-1,2,3,4,4a,5,8,8a-octahydronaphthalene, 5-methyl-2-norbornene, 5-ethyl-2-norbornene, 5-propyl-2-norbornene, 5-phenyl-2-norbornene, 5-benzyl-2-norbornene, 5-chloro-2-norbornene, 5-fluoro-2-norbornene, 5-chloromethyl-2-norbornene, 5-methoxy-2-norbornene, 7-methyl-2-norbornene, 5-isobutyl-2-norbornene, 5,6-dimethyl-2-norbornene, 5,5-dichloro-2-norbornene, 5,5,6-trimethyl-2-norbornene, 5,5,6-trifluoro-6-trifluoromethylnorbornene, 2-methyl-1,4,5,8-dimethano-1,2,3,4,4a,5,8,8a-octahydronaphthalene, 2-ethyl-1,4,5,8-dimethano-1,2,3,4,4a,5,8, 8a-octahydronaphthalene and 2,3-dimethyl-1,4,5,8-dimethano-1,2,3,4,4a,5,8,8a-octahydronaphthalene. The most preferred optional ancillary commoners for use in preparing the precursor copolymers are 2-norbornene and 5-methyl-2-norbornene.

The introduction of a third type of ancillary comonomer into the precursor copolymers used herein permits adjustment of the thermal, optical or rheological characteristics (such as glass transition temperature) of the precursor copolymers independently of the extent of functional characteristics of the copolymers introduced via epoxidation or hydroxylation of the residual double bonds of the diene-derived comonomers. The resulting copolymer materials containing these ancillary commoners can thus be characterized as terpolymers comprising three distinct types of comonomers within their polymer structure. If utilized, the optional ancillary comonomers will generally comprise from about 5 mole % to about 85 mole %, more preferably from about 10 mole % to about 80 mole %, of the precursor copolymers used in the oxidation processes herein.

For precursor copolymers which are formed from rigid dienes (and optionally also rigid ancillary comonomers), the copolymeric precursor component will generally have a weight average molecular weight, $M_w$, of from about 170,000 g/mol to about 1,000,000 g/mol, as measured versus polystyrene standards by Gel Permeation Chromatography analysis. More preferably, the rigid precursor copolymers used herein will have an $M_w$ of greater than about 175,000, even more preferably greater than about 180,000, most preferably greater than about 200,000 g/mol. As noted, weight average molecular weight for these copolymer materials can be determined in standard fashion using Gel Permeation Chromatography.

Functionalization of the copolymeric precursors, of course, adds oxygen-containing moieties to the resulting functionalized copolymers. Such functionalization thus tends to increase the molecular weight of the functionalized copolymers in comparison with the copolymeric precursor material. The extent of molecular weight increase tends to be larger for copolymer material containing higher levels of the diene-derived comonomers and higher levels of functionalization.

The precursor copolymer materials used in the present invention will preferably comprise amorphous materials. As used herein, an amorphous polymer is defined to be a polymeric material having a no crystalline component, as evidenced by no discernible melting temperature ($T_m$) in its second heat Differential Scanning Calorimetry (DSC) spectrum, or a polymeric material having a crystalline component that exhibits a second heat DSC $T_m$ with a heat of fusion ($\Delta H_f$) of less than 0.50 J/g.

The precursor copolymers used herein will preferably have certain glass transition temperature ($T_g$) characteristics. A simplistic view of the glass transition temperature of a polymeric material is the temperature below which molecules therein have very little mobility. On a larger scale, polymers are rigid and brittle below their glass transition temperature and can undergo plastic deformation above it. $T_g$ is usually applicable to amorphous phases such as are preferably present in the precursor copolymers used in the present invention.

As noted, the glass transition temperature of the precursor copolymers used herein is related to the softening point of these materials and can be measured via a variety of techniques as discussed in INTRODUCTION TO POLYMER SCIENCE AND TECHNOLOGY: AN SPE TEXTBOOK, by H. S. Kaufman and J. Falcetta, John Wiley & Sons, 1977, and POLYMER HANDBOOK by J. Brandup and E. H. Immergut, editors, John Wiley & Sons, 1989. The DSC techniques utilized in connection with the present invention are well known in the art and are described hereinafter in the Test Methods section.

For epoxidized or hydroxylated, rigid diene-containing polyolefin materials which are to be prepared by the present process and which are to be used as structural polyolefins, the glass transition temperature, $T_g$, of the copolymeric precursor component should range from about 85° C. to about 210° C., more preferably from about 100° C. to about 200° C. At such $T_g$ values, these materials can suitably be used as engineering thermoplastics. Higher $T_g$ values are generally realized by using rigid dienes such as dicyclopentadiene (and by using generally higher amounts of such rigid dienes) in the precursor copolymers.

For epoxidized or hydroxylated, flexible diene-containing polyolefin materials which are to be prepared by the present process and which are to be used as elastomeric polyolefins, the glass transition temperature, $T_g$, of the copolymeric precursor component should range from about –80° C. to about 0° C., more preferably from about –60° C. to about –10° C. At such $T_g$ values, these materials can suitably be used as elastomeric thermoplastics which are resistant to oil and high temperature conditions. These lower $T_g$ values are generally realized by using flexible dienes such as 7-methyl-1,6-octadiene (and by using generally lower amounts of such flexible dienes) in the precursor copolymers.

The precursor copolymers used in the present oxidation process can be produced via conventional polymerization reactions. Such reactions take place by contacting the requisite α-olefin, such as ethylene, with a polymerization mixture containing the requisite diene and any optional ancillary comonomers. Suitable polymerization methods include high pressure, slurry, bulk, suspension, supercritical, or solution phase, or a combination thereof. Preferably solution phase or bulk phase polymerization processes are used.

A wide variety of transition metal compounds, e.g., Ziegler-Natta catalysts and metallocenes, are known which, when activated with a suitable activator, will polymerize olefinic monomers to produce the precursor copolymers to be used in the instant oxidation process. Metallocene catalysts are preferred. A full discussion of such metallocene catalysts and catalyst systems can be found in PCT Patent Publication No. WO 2004/046214, Published Jun. 3, 2004, the entire contents of which are incorporated herein by reference.

The copolymeric precursor compounds formed by copolymerizing α-olefins, dienes and optionally other comonomers are generally recovered and separated from the polymerization reaction mixtures within which they are made, prior to their oxidation in accordance with the process of this invention. Copolymeric precursor recovery and separation can be carried out by conventional means, such as by adding to the polymerization mixture a solvent such as methanol in which the copolymeric precursor material is insoluble. This results in precipitation of the copolymeric precursor material which can then be recovered by conventional filtration techniques.

Functionalization Process

In the present functionalization process, the copolymeric precursor material containing residual unsaturation is converted to an epoxidized or hydroxylated polyolefin product by reacting the copolymeric precursor component with an alkyl hydroperoxide in the presence of a catalyst comprising a metal of Group 5 or 6 of the Periodic Table or a compound thereof. The reaction is not radical initiated so that side reactions that are common with free radical reactions are minimized. In addition, the reaction with alkyl hydroperoxide generates an alcohol by-product, which can be readily removed from the reaction effluent for reprocessing or recycling.

Suitable alkyl hydroperoxides for use as the oxidizing agent in the present process include those hydroperoxides having from about 3 to about 8 carbon atoms, such as propyl hydroperoxide, iso-propyl hydroperoxide, t-amyl hydroperoxide, cyclohexyl hydroperoxide, 1,1,3,3-tetramethylbutyl hydroperoxide and t-butyl hydroperoxide, with t-butyl hydroperoxide being preferred. Generally, the alkyl hydroperoxide is added to the oxidation reaction medium in an amount to provide from about 1.0 to about 4.0 moles, typically from about 1.5 to about 3.5 moles, of alkyl hydroperoxide for every mole of olefinic carbon-carbon double bond within the copolymer to be subjected to oxidation.

Suitable Group 5 and 6 components for catalyzing the present oxidation reaction include vanadium, tungsten and molybdenum, either as the free elements or as compounds thereof, with molybdenum species being preferred. Suitable molybdenum species include organomolybdenum complexes having some solubility in organic solvents, such as molybdenum hexacarbonyl or molybdenum acetylacetonate. Generally, the Group 5 or 6 catalyst component is added to the oxidation reaction medium in an amount to provide from about 0.01 to about 0.25 moles, typically from about 0.05 to about 0.1 moles, of the catalyst component for every mole of olefinic carbon-carbon double bond within the copolymer to be subjected to oxidation.

The oxidation reaction is carried out in a suitable reaction medium which will generally be a liquid reaction medium. The reaction medium can comprise only the reactants and catalyst materials essentially utilized in the process. More conventionally, however, the liquid reaction medium will generally comprise a suitable reaction solvent in which the reactants and catalyst materials can be dissolved, suspended or dispersed. In this respect, a liquid which does not participate in the reaction and which forms the reaction medium is referred to herein as a "reaction solvent" even though not all of the materials within the reaction medium will necessarily be completely dissolved in or miscible with such a liquid.

Suitable reaction solvents include organic liquids which are inert in the reaction mixture. By "inert" is meant that the solvent does not deleteriously affect the oxidation reaction. Such suitable inert organic solvents include aromatic hydrocarbons such as benzene, toluene, xylene, benzonitrile, nitrobenzene, adiponitrile, anisole, phenyl nonane; saturated aliphatic hydrocarbons having from about 5 to about 20 carbons, such as pentane, hexane, heptane adiponitrile; halogenated hydrocarbons such as methylene chloride, 1,2-dichloroethane, chloroform, carbon tetrachloride and the like; non-fluorinated, substituted saturated aliphatic and/or aromatic hydrocarbons having from about 1 to about 20 carbons including those selected from the group consisting of alcohols such as: methanol, propanol, butanol, isopropanol, 2,4-di-t-butyl phenol; ketones such as acetone; carboxylic acids such as propanoic acid, acetic acid; esters such as ethyl acetate, ethyl benzoate, dimethyl succinate, butyl acetate, tri-n-butyl phosphate; dimethyl phthalate; and ethers, such as tetraglyme; and mixtures thereof.

Typically the oxidation is conducted at a temperature ranging from about 25° C. to about 180° C., such as from about 60° C. to about 120° C. Suitable reaction times will generally range from about 0.5 to about 18 hours, such as from about 2 to about 6 hours.

The invention will now be more particularly described with reference to the following Examples.

EXAMPLE 1

Mo Catalyzed Epoxidation of E/MOD Copolymer 5 g of a copolymer of ethylene with 7-methyl-1,6-octadiene (MOD) containing 19.5 mole % (20.8 mmole) MOD was charged into a reaction flask with 0.308 g $Mo(CO)_6$ (264 g/mole, 1.165 mmoles Mo) and dissolved in 200 mL toluene. The reaction solution was heated to 90° C. and stirred. 14.56 mL of t-butylhydroperoxide (5.5 M in hexane, 72.8 mmoles) were added to the flask with a syringe. The reaction mixture was stirred at 90° C. for 5 hours. The reaction mixture was cooled to room temperature, and the polymer was precipitated from solution by the addition of methanol. The product was collected by vacuum filtration, washed with a small amount of acetone and dried in a vacuum oven at 60° C. overnight.

FTIR analysis of the resultant product showed that residual olefin was barely discernible, whereas weak hydroxyl peaks were present at 3200-3600 $cm^{-1}$, and epoxide peaks at 895 and 1121 $cm^{-1}$.

$^1$H NMR reported as % of total hydrogen gave an olefin peak at 5.15 ppm (0.01%), isomerized olefin at 4.8 ppm (0.24%), mono OH at 4 ppm (0.26%), diOH at 3.5 ppm (0.18%), epoxide at 2.65 ppm (0.34%), epoxide at 2.4 ppm (0.53%), and aliphatic at 0.8-1.8 ppm (98.38%).

EXAMPLE 2

Mo Catalyzed Epoxidation of E/O/VCH Terpolymer 2 g of terpolymer of ethylene, octene and 4-vinyl-1-cyclohexene (VCH) containing 60.9 mole % ethylene, 25.3 mole % octene and 13.8 mole % VCH (4.6 mmole VCH) was charged into a reaction flask with 0.084 g $Mo(acac)_2$ (326.16 g/mole, 0.257 mmoles Mo) and dissolved in 100 mL toluene. The reaction solution was heated to 90° C. and stirred. 3.2 mL of t-butylhydroperoxide (5 M in hexane, 16.1 mmoles) were added to the flask with a syringe. The reaction mixture was stirred at 90° C. for 2 hours. The reaction mixture was cooled to room temperature, and the polymer was precipitated from solution by the addition of methanol. The product was collected by vacuum filtration, washed with a small amount of acetone and dried in a vacuum oven at 60° C. overnight.

FTIR analysis showed a trace residual olefin, a broad hydroxyl peak at 3100-3600 $cm^{-1}$, and epoxide peaks at 798 and 1260 $cm^{-1}$.

$^1$H nmr reported at % of total hydrogen gave an olefin peak at 5.6 ppm (0.05%), OH alpha H at 4.0 ppm and 3.85 ppm (0.06% total), epoxide peaks at 3.0-3.2 ppm (0.15%), and an aliphatic peak at 0.2-2.7 ppm (99.74%).

What is claimed is:

1. A process for functionalizing an α-olefin/diene copolymer, which process comprises contacting in a reaction medium (a) a copolymer comprising units derived from at least one α-olefin and units derived from at least one diene, selected from 1,6- or 2,5-dienes, which copolymer contains at least one double bond, with b) an alkyl hydroperoxide in the presence of a catalyst comprising a metal of Group 5 or 6 of the Periodic Table or a compound thereof, under reaction conditions which promote formation of an oxirane ring or hydroxyl groups at the site of said double bond.

2. The process of claim 1 wherein said at least one α-olefin is selected from ethylene and propylene.

3. The process of claim 1 wherein said at least one α-olefin comprises a combination of ethylene with another α-olefin selected from 1-octene, 1-hexene and/or 1-butene.

4. The process of claim 1 wherein said copolymer comprises a terpolymer of at least one α-olefin, at least one diene and at least one further comonomer which is selected from acyclic, monocyclic and polycyclic mono-olefins containing from about 4 to 18 carbon atoms.

5. The process of claim 1 wherein said at least one diene is selected from the group consisting of ethylidene norbornene and 7-methyl-1,6-octadiene.

6. The process of claim 1 wherein said copolymer comprises 5 to 50 mole % of units derived from said at least one diene.

7. The process of claim 1 wherein said copolymer comprises 10 to 35 mole % of units derived from said at least one diene.

8. The process of claim 1 wherein said metal comprises molybdenum.

9. The process of claim 8 wherein said molybdenum is present as an organomolybdenum species.

10. The process of claim 1 wherein said alkyl hydroperoxide comprises from about 3 to about 8 carbon atoms.

11. The process of claim 1 wherein said alkyl hydroperoxide comprises t-butyl hydroperoxide.

12. The process of claim 1 wherein said alkyl hydroperoxide is added to said reaction medium in an amount to provide from about 1.0 to about 4.0 moles of said alkyl hydroperoxide per mole of olefinic carbon-carbon double bond within the copolymer.

13. The process of claim 1 wherein said Group 5 or 6 metal or metal compound is added to said reaction medium in an amount to provide from about 0.01 to about 0.25 moles of said metal or metal compound per mole of olefinic carbon-carbon double bond within the copolymer.

14. The process of claim 1, wherein said reaction conditions include a temperature of about 25° C. to about 180° C. for a time of about 0.5 to about 18 hours.

* * * * *